(12) United States Patent
Strauss

(10) Patent No.: US 10,011,019 B1
(45) Date of Patent: Jul. 3, 2018

(54) WIND-UP GRIPPER FOR A ROBOTIC DEVICE

(71) Applicant: X Development LLC, Mountain View, CA (US)

(72) Inventor: Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 262 days.

(21) Appl. No.: 15/146,688

(22) Filed: May 4, 2016

(51) Int. Cl.
*B25J 15/02* (2006.01)
*B25J 15/00* (2006.01)
*B25J 15/08* (2006.01)

(52) U.S. Cl.
CPC ........... *B25J 15/0028* (2013.01); *B25J 15/08* (2013.01)

(58) Field of Classification Search
CPC ...... B25J 15/0028; B25J 15/08; B25J 15/024; B25J 15/0206; A61F 2/586; Y10S 901/38; Y10S 901/39
USPC .................................. 294/106, 198; 623/64
See application file for complete search history.

(56) References Cited

U.S. PATENT DOCUMENTS

| | | | | | |
|---|---|---|---|---|---|
| 2,609,954 | A | * | 9/1952 | Sutherland | B66C 1/22 212/327 |
| 3,362,545 | A | * | 1/1968 | Rowe | C03B 9/447 294/106 |
| 3,400,966 | A | * | 9/1968 | Creel | B60P 3/41 294/104 |
| 3,910,326 | A | * | 10/1975 | Tucek | A01G 23/081 144/34.1 |
| 4,286,380 | A | * | 9/1981 | Blount | B25J 15/10 29/593 |
| 4,600,357 | A | | 7/1986 | Coules | |
| 5,054,836 | A | | 10/1991 | Shulz | |
| 5,501,498 | A | | 3/1996 | Ulrich | |
| 7,168,748 | B2 | * | 1/2007 | Townsend | B25J 9/1612 294/106 |
| 7,341,295 | B1 | * | 3/2008 | Veatch | A61F 2/588 294/106 |
| 8,141,925 | B2 | * | 3/2012 | Mizuno | B25J 9/102 294/106 |
| 8,534,729 | B2 | | 9/2013 | Wilkinson et al. | |

(Continued)

FOREIGN PATENT DOCUMENTS

| JP | 3156145 U | 12/2009 |
|---|---|---|
| JP | 2011245568 A | 8/2011 |

*Primary Examiner* — Gabriela M Puig
(74) *Attorney, Agent, or Firm* — McDonnell Boehnen Hulbert & Berghoff LLP

(57) ABSTRACT

A robotic gripping device is provided. The robotic gripping device includes two opposable fingers and an actuator having a motor and a shaft, wherein the shaft is coupled to a first finger. The robotic gripping device also includes a torsion spring surrounding the actuator, the torsion spring having first and second ends, wherein the first end is coupled to the motor of the actuator and the second end is coupled to a second finger. Further, the actuator is configured to rotate the shaft relative to the motor by a first amount to move the two opposable fingers toward each other to contact the object. The actuator is also configured to further rotate the shaft relative to the motor to wind up the torsion spring when the two opposable fingers are both in contact with the object and the object prevents the fingers from further movement toward each other.

20 Claims, 10 Drawing Sheets

(56) References Cited

U.S. PATENT DOCUMENTS

| | | | |
|---|---|---|---|
| 8,936,289 B1* | 1/2015 | Kozlowski | B25J 15/0009 |
| | | | 294/106 |
| 2005/0036231 A1* | 2/2005 | Dickey | B25J 15/0206 |
| | | | 360/92.1 |
| 2005/0040663 A1 | 2/2005 | Kameda et al. | |
| 2010/0095799 A1 | 4/2010 | Albin et al. | |
| 2012/0215358 A1 | 8/2012 | Gettings et al. | |
| 2013/0057004 A1 | 3/2013 | Murata et al. | |
| 2013/0090761 A1 | 4/2013 | Sejimo et al. | |
| 2014/0117686 A1 | 5/2014 | Akae | |
| 2014/0132018 A1* | 5/2014 | Claffee | B25J 9/0015 |
| | | | 294/192 |
| 2015/0190931 A1 | 7/2015 | Claffee et al. | |
| 2017/0320216 A1* | 11/2017 | Strauss | B25J 15/0213 |

\* cited by examiner

WIND-UP GRIPPER FOR A ROBOTIC DEVICE

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

The present application discloses implementations that relate to determining an amount of torque applied to the fingers of a robotic gripping device. When a robotic gripping device grasps an object, the fingers may apply pressure to the object, which in turn applies a reaction force resulting in a torque on the fingers. Implementations disclosed herein may include fingers coupled to either end of a rotating actuator that includes a motor and a shaft. The actuator may be mounted via ball bearings to a base, such that the motor and shaft can rotate freely in the same direction, or in opposite directions (such as when the actuator is activated). Fingers coupled to the actuator may move correspondingly in the same direction or in opposite directions (such as to open or close a grasp), which may cause a torque to act on the fingers. It may be beneficial for a user, operator, or control system to know how much torque or force is being applied to the fingers and/or object.

In one embodiment, a robotic gripping device may include two fingers, an actuator, and a torsion spring, arranged such that a torque applied to the fingers causes the torsion spring to wind up. The robotic gripping device may also include one or more encoders that detect the rotation of the actuator and/or its components, and the rotation of the fingers. When the characteristics of the spring are known, the amount of torque can be determined from the encoders, without special torque sensors or complex systems or geometries. As such, the present disclosure provides a simpler and more efficient technique for measuring torque on robotic fingers.

In one example, the present application describes a robotic gripping device. The robotic gripping device includes two opposable fingers configured to move toward each other to grasp an object. The robotic gripping device also includes an actuator having a motor and a shaft, wherein the shaft is coupled to a first finger of the opposable fingers. The robotic gripping device yet further includes a torsion spring surrounding the actuator, the torsion spring having a first end and a second end, wherein the first end is coupled to the motor of the actuator and the second end is coupled to a second finger of the two opposable fingers. The actuator of the gripping device is configured to rotate the shaft relative to the motor by a first amount to move the two opposable fingers toward each other to contact the object. The actuator is further configured to, when the two opposable fingers are both in contact with the object and the object prevents the fingers from further movement toward each other, further rotate the shaft relative to the motor to wind up the torsion spring.

In another example, the present application describes a robotic gripping device. The robotic gripping device includes two opposable fingers configured to move toward each other to grasp an object. The robotic gripping device also includes an actuator having a motor and a shaft, wherein the motor is coupled to a first finger of the opposable fingers. The robotic gripping device yet further includes a torsion spring surrounding the actuator, the torsion spring having a first end and a second end, wherein the first end is coupled to the shaft of the actuator and the second end is coupled to a second finger of the two opposable fingers. The actuator of the gripping device is configured to rotate the shaft relative to the motor by a first amount to move the two opposable fingers toward each other to contact the object. The actuator is further configured to, when the two opposable fingers are both in contact with each other and the object prevents the fingers from further movement toward each other, further rotate the shaft relative to the motor to wind up the torsion spring.

In a third example, a method is described. The method involves identifying an object for a robotic gripping device to grasp, wherein the robotic gripping device comprises two opposable fingers, an actuator, and a torsion spring. The two opposable fingers are configured to move toward each other to grasp the object. The actuator has a motor and a shaft, wherein the shaft is coupled to the first finger of the two opposable fingers. The torsion spring surrounds the actuator and has first and second ends, wherein the first end of the torsion spring is coupled to the motor of the actuator and the second end of the torsion spring is coupled to the second finger of the two opposable fingers. The method also involves rotating the shaft of the actuator relative to the motor by a first amount to move the two opposable fingers toward each other to contact the object. The method further involves, when the two opposable fingers are both in contact with the object which prevents the fingers from further movement toward each other, further rotating the shaft of the actuator relative to the motor to wind up the torsion spring.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
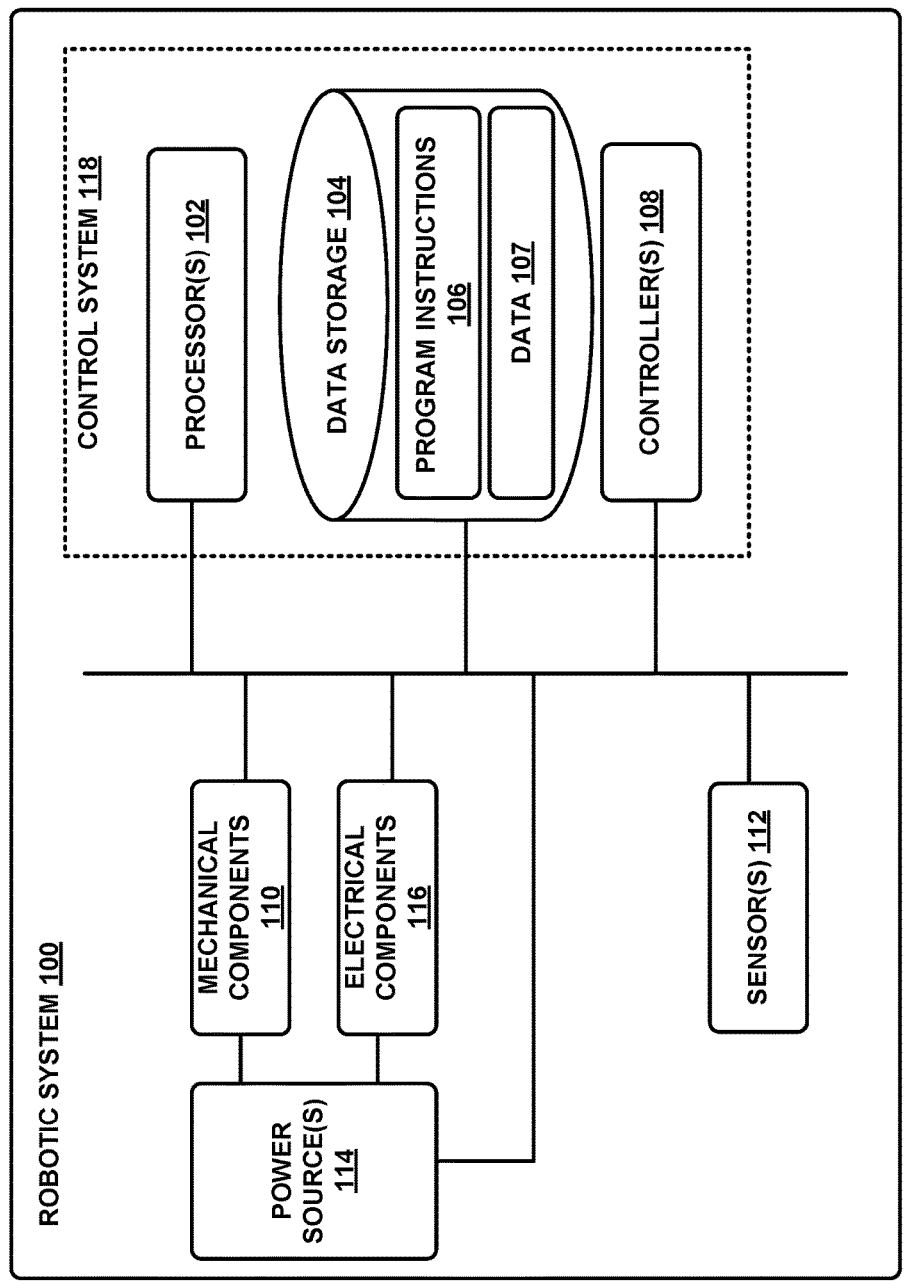
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. OVERVIEW

Robotic arms may include many different types of end effectors. One often used type of end effector is a gripper, which allows a robotic arm to grip or grasp an object. Many grippers include two or more fingers that act to grasp an object in a pincer-like or pinching manner. In some cases, these grippers may include underactuated fingers. Underactuated fingers include the benefit of less complexity and easier control because each phalanx of the finger is not independently actuated. Instead, the full finger is actuated together.

In many applications, it may be beneficial to know the position, orientation, and any forces acting upon the components of a robotic system. For instance, a control system of a robotic device including a robotic gripper may require information about the position, orientation, and forces acting on the arm, hand, and/or fingers of the robotic gripper. To accomplish this task, one technique may include attaching one or more sensors to the components of the gripper that can measure and/or detect the position, orientation, and or forces.

However, using multiple sensors or particularized sensors for a specific purpose may require a complex control system and/or a complex arrangement of components. It may also limit mobility, increase the cost of manufacturing, or otherwise detract from the efficiency and usefulness of a robotic device.

In many applications of robotic gripping devices in which the robotic gripping device interacts with an environment, the torque applied to the fingers is of particular relevance. For example, in a context where a robotic gripping device interacts with soft or pliable objects, fragile objects, or delicate objects, it may be beneficial to have information about the torque applied to the fingers and thus to the object within the robotic gripper's grasp.

As such, example embodiments provide devices, systems, and methods for determining or detecting a torque applied to the fingers of a robotic gripper in a simple and efficient way, without the use of overly complex sensors and control systems.

Example embodiments of a robotic gripping device disclosed herein may include two opposable fingers, configured to move toward each other to grasp an object. The fingers may be underactuated, and may be arranged such that respective gripping surfaces of the fingers face each other. The fingers may be configured such that the first finger may move independently from the second finger, and may continue to move when the second finger is prevented from movement.

The robotic gripping device may also include an actuator having a motor and a shaft. The actuator may be rotatably coupled to a base section via ball bearings, for example, such that the actuator can rotate freely. When the actuator is activated, engaged, or turned on, the shaft may rotate relative to the motor, and as a result the shaft may rotate in a clockwise or counterclockwise direction, and the motor may rotate in the opposite direction. The ball bearings may allow the motor and shaft to rotate in opposite directions relative to each other when the actuator is activated.

In some examples, the shaft may be coupled to a first finger of the two opposable fingers, such that rotation of the shaft causes the first finger to move or rotate. The robotic gripping device may also include a torsion spring surrounding the actuator. The torsion spring may be coupled on a first end to the motor, and on a second end to the second finger of the two fingers. When the actuator is activated, the shaft may rotate the first finger and the motor (rotating in the opposite direction) may cause the torsion spring to rotate as a whole (but not wind up), and in turn cause the second finger to rotate.

As such, the two opposable fingers may move toward each other to grasp an object. When the actuator rotates the shaft relative to the motor by a first amount, the two opposable fingers may move toward each other and make contact with an object. Alternatively, if there is no object present, the fingers may move and make contact with each other. The actuator may then attempt to rotate the shaft relative to the motor further, in an attempt to move the fingers closer to each other. As a result, however, the object (or the fingers themselves) may provide a reaction force resulting in a torque on the fingers, preventing them from moving or closing further. In that case, additional rotation of the shaft with respect to the motor may wind up the torsion spring. When the finger is prevented from further movement, the second end of the torsion spring (i.e., the end coupled to the finger) may remain fixed. The first end of the spring (i.e., the end coupled to the motor), however, may rotate along with the motor. As such, the torsion spring may wind up by twisting out of equilibrium in response to the torque put on the fingers.

In some examples, the robotic gripping device may include one or more encoders that may detect the position or rotation of the shaft, motor, and/or fingers. A control system may then be able to determine an amount of torque on the fingers based on the encoders and a characteristic of the spring. For instance, the encoders may indicate that (1) the fingers have each rotated by a quarter turn, and (2) the shaft has rotated relative to the motor by three-quarters turn. Given a spring constant value of the torsion spring and the quarter turn difference between the fingers and actuator, a torque value may be determined.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. In some instances, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors (or encoders) to sense or detect the position of the actuators of the robotic system. For instance, such position sensors may sense states of extension, retraction, positioning, or rotation of the actuators on arms, legs, hands, feet, fingers, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
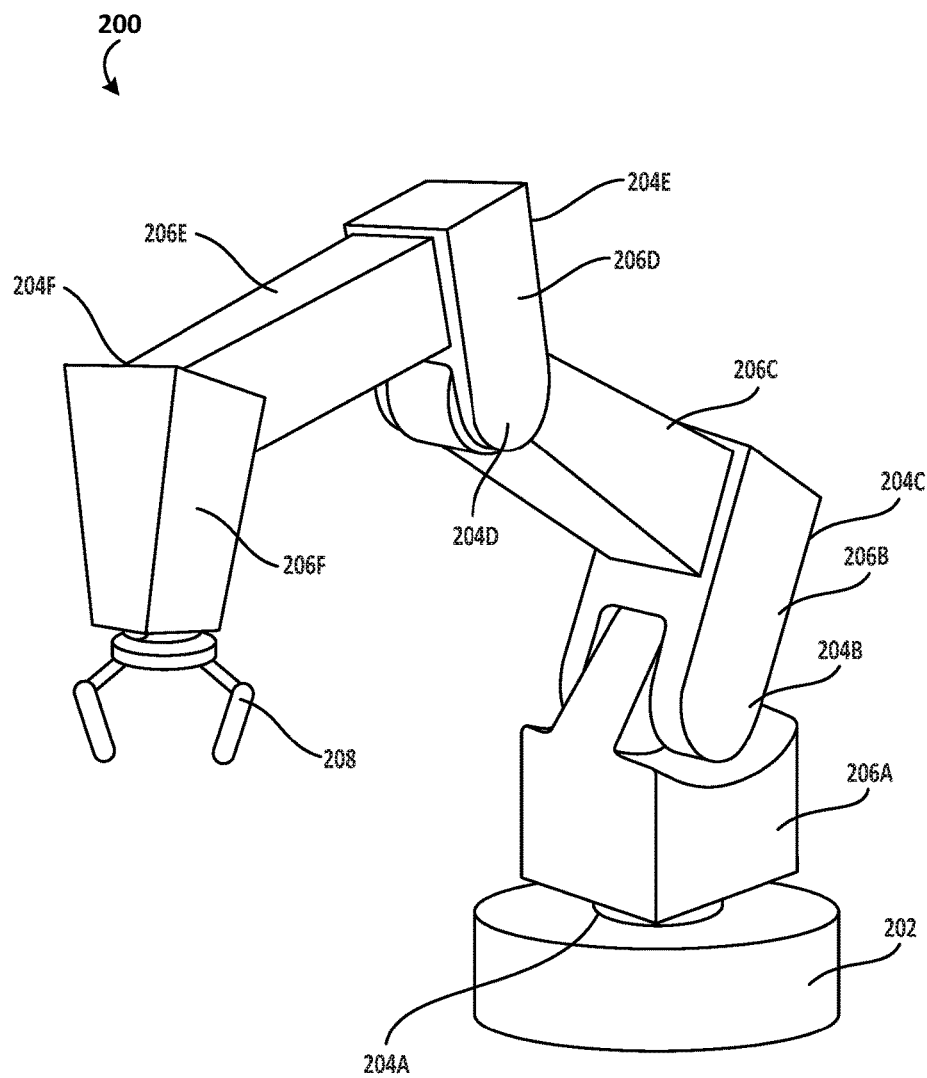
FIG. 2 illustrates an example robotic arm, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
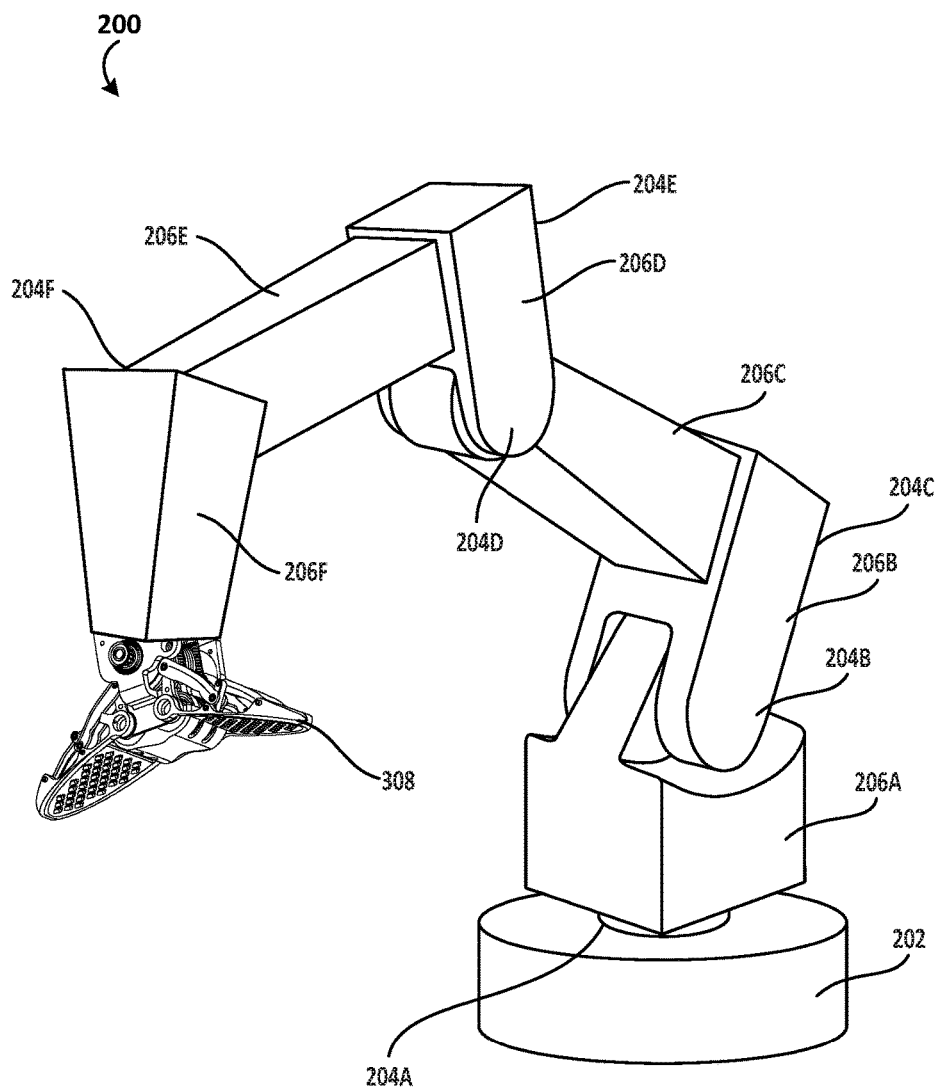
FIG. 3 illustrates the example robotic arm of FIG. 2 having a robotic gripping device, according to an example implementation.

FIG. 3 shows the example robotic arm 200 with a robotic gripping device 308. Robotic gripping device 308 may be similar or identical to robotic gripping device 400 described in more detail below.

III. EXAMPLE ROBOTIC GRIPPING DEVICE

Figure 4:
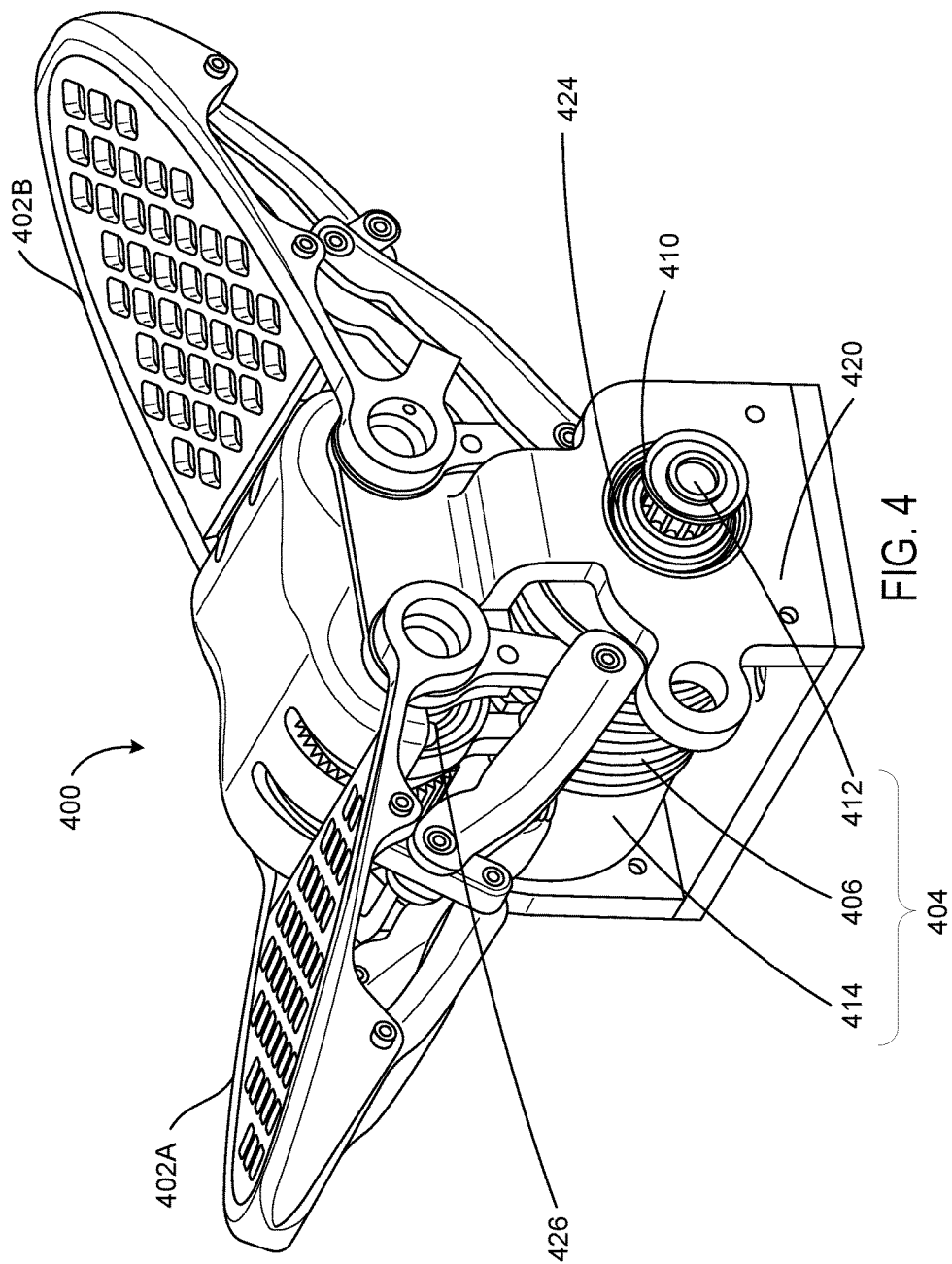
FIG. 4 illustrates an example robotic gripping device, according to an example implementation.

As noted above, the present disclosure includes implementations that relate to efficiently determining a torque applied to fingers of a robotic gripping device. FIG. 4 illustrates an example robotic gripping device 400 according to an example implementation. Robotic gripping device 400 may be implemented as a mechanical component of system 100 and/or robotic arms 200 and/or 300. Although the components illustrated in FIG. 4 are shown with a certain orientation and/or design, it should be understood that one or more components of robotic gripping device 400 may be removed, added, and/or modified while remaining within the scope of this disclosure. Also, the orientation and combination of components may be changed based on the desired implementation.

Robotic gripping device 400 may include one or more physical components, including one or more fingers 402A-B, actuator 404, and/or spring 406. In some examples, robotic gripping device 400 may include two opposable fingers, as shown in FIG. 4. In other examples, more or fewer fingers may be included. For instance, where three or more fingers are included, the fingers may be arranged in two groups opposing each other, such that when they are actuated they close toward each other. Two fingers may be positioned opposite the third, such that when the fingers close they interlock.

Each finger 402A-B may be configured to move in a gripping direction, to contact, grasp, hold, grip, or otherwise interact with an object. In this disclosure, movement of the fingers may refer to rotation of the fingers about one or more axis. For example, the base of each finger may be rotatably coupled along a respective axis to one or more other components of the robotic gripping device, and movement of each finger may include rotation of the fingers about the respective axes. In this manner, the base of the fingers may remain relatively separated with respect to each other, while the tips of the fingers (i.e., the parts of the fingers opposite the bases) rotate toward each other, and may contact each other.

In other examples, movement of the fingers may include translational movement along an axis, such as movement in a clamping or sliding manner. The fingers may be coupled to one or more components of the robotic gripping device in a manner that allows them to maintain their orientation with respect to each other without rotating. For instance, the fingers may move in a manner similar to how the components of a vice move toward each other, such that the planes created by the gripping surface of each finger remain fixed relative to each other while movement of the fingers occurs. Or, the movement may be a combination of rotation and translation. Other types of movement are contemplated, with the above examples being included for description and to aid in understanding of the concepts involved herein.

The gripping surface of the fingers may be flexible and/or deformable, and may be a flexible plastic, rubber, or other material suitable for gripping an object. As a result, movement of the fingers may include deformation of the gripping surface and/or structure of the fingers. For example, the fingers may deform, bend, curve, distort, warp, stretch, or otherwise alter their shape based on one or more factors, such as an impacting force or pressure. In an example embodiment, a two finger robotic gripping device such as the one shown in FIG. 4 may include an object placed at the midpoint of the fingers. When the fingers close on the object, the object may cause the tips of the fingers to bend or curl around the object. As described herein, movement of the fingers may include this deformation of the fingers.

In some examples, the fingers may be underactuated or hyper-underactuated. Underactuated fingers do not include an actuator for each phalanx of the finger, but instead have fewer actuators and cannot control each phalanx independently. A phalanx is a section of a finger. As an example, a typical human index finger includes three phalanges. As a benefit, underactuated fingers require less complex control systems and are simpler to manufacture than fully actuated fingers. Hyper-underactuated grippers may include one actuator to move two or more fingers. For instance, in a robotic gripping device having two hyper-underactuated opposable fingers that close in a pinching manner, a single actuator may cause both fingers to move toward each other to pinch an object. Benefits of grippers with hyper-underactuated fingers are similar to those of underactuated fingers, but may require even less complex control systems and simpler manufacturing techniques.

The fingers of the present disclosure may be configured such that movement of a first finger can occur while movement of a second finger is prevented, such as by an object or the environment (e.g., a wall, table, or other body in an environment) in which the robotic gripping device exists. The two finger robotic gripping device shown in FIG. 4 may include a single actuator that causes both fingers to move (i.e., hyper-underactuated fingers). Further when a first of the two fingers is prevented from movement because it has contacted an object or the environment, the second finger may move or may continue to move.

Robotic gripping device 400 may also include an actuator 404. Actuator 404 may include motor 414 and shaft 412. When actuator 404 is turned on, engaged, or otherwise activated, motor 414 may rotate shaft 412 in a clockwise or counterclockwise direction. In some examples, shaft 412 of actuator 404 may be coupled to a first finger 402A, and may be configured to cause the first finger 402A to move. As used herein, a first component "coupled" to a second component can refer to two components directly connected to each other, or may refer to the two components having one or more components, gears, shafts, belts, or connecting elements placed between them.

As shown in FIG. 4, shaft 412 of actuator 404 may be coupled to an output gear 410, such that when shaft 412 rotates output gear 410 rotates as well. Output gear 410 may in turn be coupled to finger 402A through a series of gears, pulleys, belts, or other coupling mechanisms (not shown). Output gear 410 may be configured such that rotation of output gear 410 causes finger 402A to move, such as by rotating or moving toward or away from an object.

In some examples, actuator 404 may be rotatably coupled to base 420, via two ball bearings, for example. Other types of rotational coupling are possible as well. In these examples, actuator 404 may rotate freely with respect to base 420, such that when motor 414 rotates shaft 412 in a clockwise direction, motor 414 may responsively rotate in a counterclockwise direction. As such, activation of actuator 404 may include relative rotation of shaft 412 with respect to motor 414, such as rotation of shaft 412 only, rotation of both shaft 412 and motor 414 in opposite directions, and/or rotation of motor 414 only. Base 420 may be coupled to a robotic arm or appendage.

Robotic gripping device 400 may also include spring 406. Spring 406 may be a torsion spring, which may operate by torsion or twisting to store mechanical energy. The use of a torsion spring may be beneficial in that it may act as a spring and a motor cage when positioned around the actuator, which may protect the motor and/or shaft. In addition, the use of a torsion spring may allow the overall size of the robotic gripping device to be smaller, because additional components and coupling elements may not be required. In some examples, the term 'wind up' may be used in connection with the spring, and as such may refer to the spring being twisted.

In some examples, spring 406 may surround actuator 404 in whole or in part. As shown in FIG. 4, spring 406 surrounds part of actuator 404 including part of motor 414. More or less of actuator 404 may be surrounded by spring 406. Arranging spring 406 around actuator 404 results in a more compact design, allowing a robotic gripping device with this arrangement of components to be smaller and thus appropriate for more uses and applications. In other examples, spring 406 may be positioned to the side or otherwise not surrounding any part of actuator 404.

In some examples, spring 406 may include a first end and a second end. The first end may be coupled to motor 414 while the second may be coupled to the second finger 402B. The first end may be coupled to motor 414 via a pin with a segment of spring 406 wrapped around the pin. Similarly, the second end of spring 406 may be coupled to the first finger via a pin and wrapped segment. These couplings are shown in more detail later with respect to FIG. 6. Other couplings are possible.

Spring 406 may have one or more characteristics, such as size, firmness, spring constant, or material. Each of these characteristics may be altered based on the particular application of the robotic gripping device. For example, a spring with a higher spring constant may require more force to compress or twist, which may be used to determine the appropriate spring to use for a particular application.

In some examples, the robotic gripping device may also include one or more encoders, sensors, or detectors configured to detect the rotation, position, movement, and/or forces acting on one or more parts of the robotic gripping device. For example, robotic gripping device 400 may include actuator encoder 424, which may be positioned on the shaft 412 of the actuator 404. Actuator encoder 424 may be configured to detect the rotation of shaft 412 relative to motor 414, and may provide information about the extent or amount of relative rotation to a control system. Actuator encoder 424 may also be positioned on motor 414, or may be positioned on one or more other components of robotic gripping device 400. In some examples, actuator encoder 424 may also detect the rotation of the actuator with respect to base 420, and/or the rotation of either or both of shaft 412 and motor 414 with respect to base 420. As such, both relative and absolute amounts of rotation of shaft 412 and motor 414 may be detected.

Robotic gripping device 400 may also include finger encoder 426. Finger encoder 426 may be configured to detect the movement and/or rotation of either or both of fingers 402A-B. For example, finger encoder 426 may be configured to detect the amount of rotation of one or both of fingers 402A-B through respective axes (i.e. half turn, quarter turn, twenty degree turn, etc.). In some examples, finger encoder 426 may be configured to measure or detect the movement of a finger along a track (i.e. a distance the finger has moved or slid), such as where the robotic gripping device include fingers 402A-B arranged to move in a clamping or 'vice-like' manner. Further, a single finger encoder may detect the rotation or movement of both fingers, while in other examples each finger 402A-B may be associated with a separate finger encoder.

Actuator encoder 424 and finger encoder 426 may be rotary encoders. In some cases, the encoders may be mechanical, optical, magnetic, capacitive, or any other type of encoder. In addition, the encoders may be absolute encoders or may be incremental encoders. Further, actuator encoder 424 and finger encoder 426 may be the same type of encoder or may be different. In addition, the actuator encoder 424 and finger encoder 426 may have a relationship to each other, such as a one-to-one relationship, in which a ninety degree rotation of the shaft relative to the motor corresponds to a ninety degree rotation of a finger, or a two-to-one relationship or any other relationship.

Robotic gripping device 400 may also include a control system such as control system 118 in FIG. 1, which may control one or more aspects of robotic gripping device 400. The control system may include one or more processors, and may also include a non-transitory computer-readable memory, which may have stored thereon instructions executable by the one or more processors to carry out one or more actions described in this disclosure.

In some examples, the control system may be configured to determine an amount of torque applied to the fingers of the robotic gripping device. This action may include receiving information from one or more encoders and determining the torque based on the received information. For instance, in one example the control system may receive information from actuator encoder 424 and finger encoder 426, and determine a torque applied to the fingers based on the received information and a characteristic of spring 406 such as the spring constant. In practice, this determination may include steps to detect, by the actuator encoder 424, the amount of rotation of shaft 412 relative to motor 414 and, detect, by the finger encoder 426, an amount of movement or rotation of either or both of fingers 402A-B. Where the amounts of rotation do not match or correspond to each other (i.e., the encoders detect different amounts of rotation of the actuator and fingers), the difference in rotation may be reflected in a compression or winding up of spring 406.

One particular example of the control system measuring torque acting on the fingers includes the actuator encoder and finger encoder having a one-to-one ratio (i.e., for each quarter rotation of the shaft relative to the motor, the fingers rotate by one quarter turn). In this example, the fingers may be moved to close on an object, and may be stopped from further closing on the object after a half turn. The actuator, however, may continue to attempt to close the fingers by rotating the shaft relative to the motor. At this time, the finger encoder may indicate to the control system that the fingers have each rotated by one quarter turn. However, the actuator encoder may indicate at the same time that the shaft has rotated by three quarters turn. Because there is a one-to-one ratio, the difference of one quarter turn indicates that there is an additional torque acting on the fingers, causing the fingers to rotate one quarter turn less than is indicated by the actuator encoder. The control system may use the quarter turn difference and the characteristics of the spring, such as by multiplying or feeding them into a predetermined equation, to determine that a torque is acting on the fingers.

In some examples, the control system may also be configured to identify an object for the robotic gripping device to grasp and activate the actuator to move the fingers. These actions are described in more detail below with respect to FIG. 7.

Figure 5:
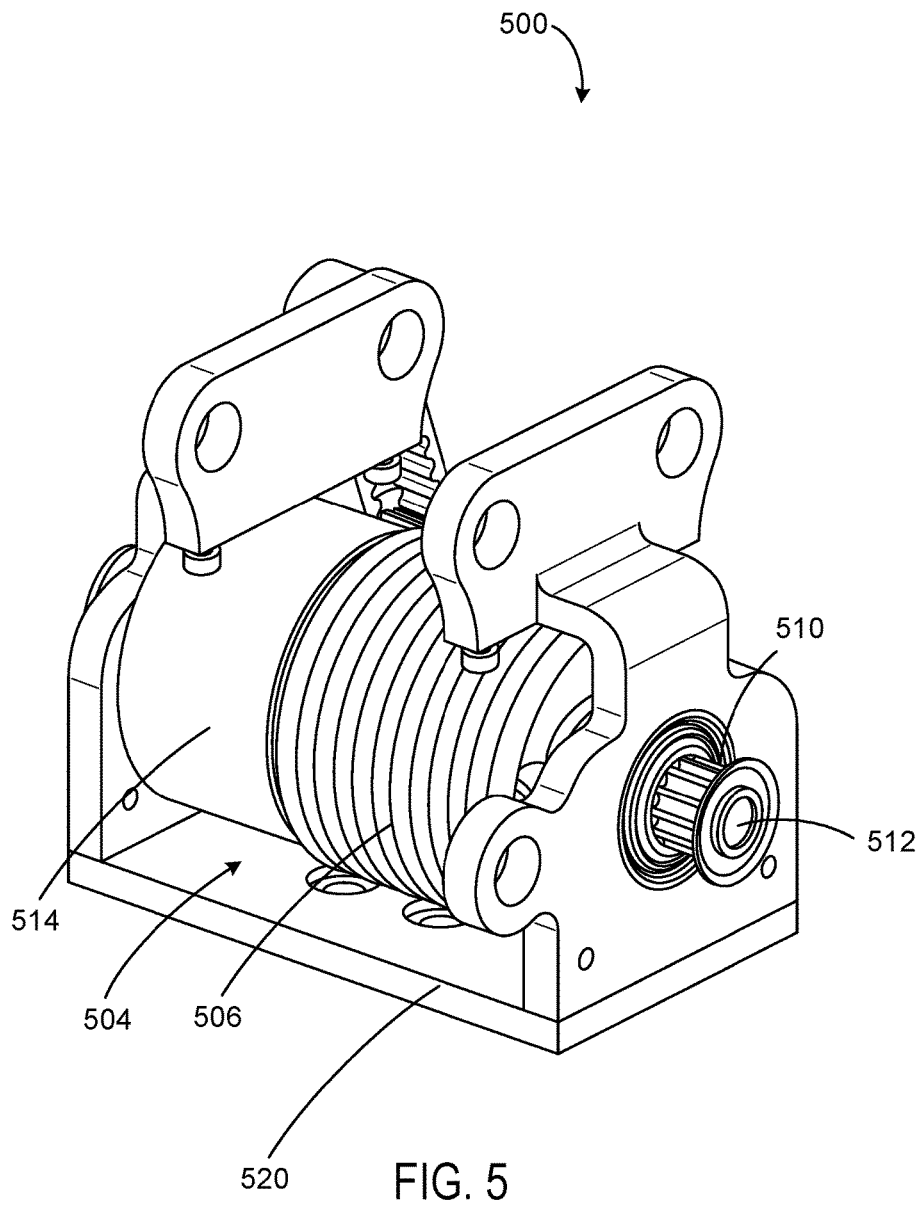
FIG. 5 illustrates an actuator and base of a robotic gripping device, according to an example implementation.

FIG. 5 illustrates actuator 504 and base 520 of robotic gripping device 500 according to an example implementation. Actuator 504 includes shaft 512 and motor 514. Actuator 504 is rotatably coupled to base 520 via ball bearings. The ball bearings allow actuator 504 to rotate within the base. FIG. 5 also shows spring 506, which is shown as a torsion spring surrounding part of actuator 504. Further, FIG. 5 shows output gear 510, which is coupled to shaft 512, and may also be coupled to and/or control a finger (not shown).

Figure 6A:
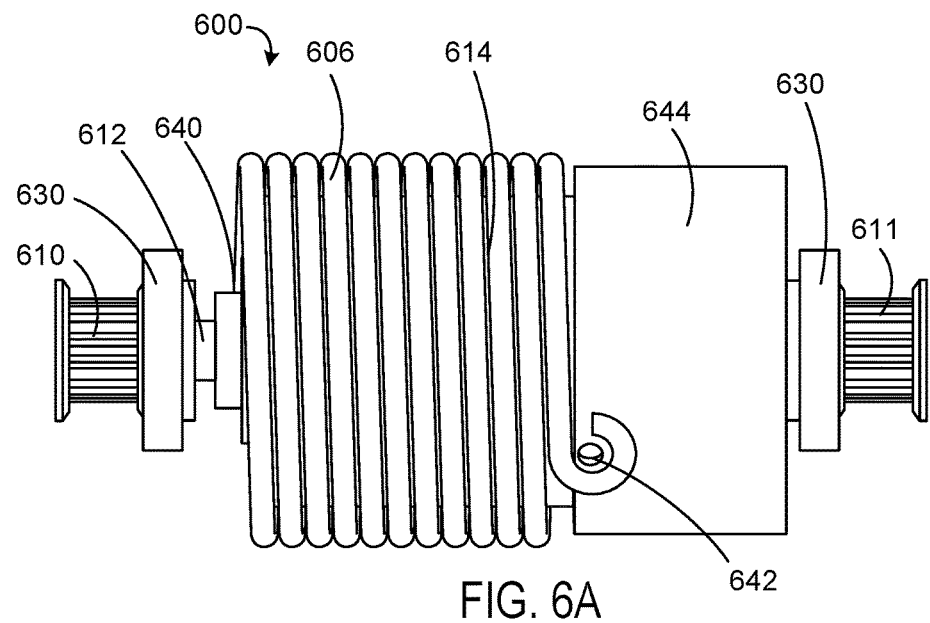
FIG. 6A illustrates an example actuator and spring assembly, according to an example implementation.
Figure 6B:
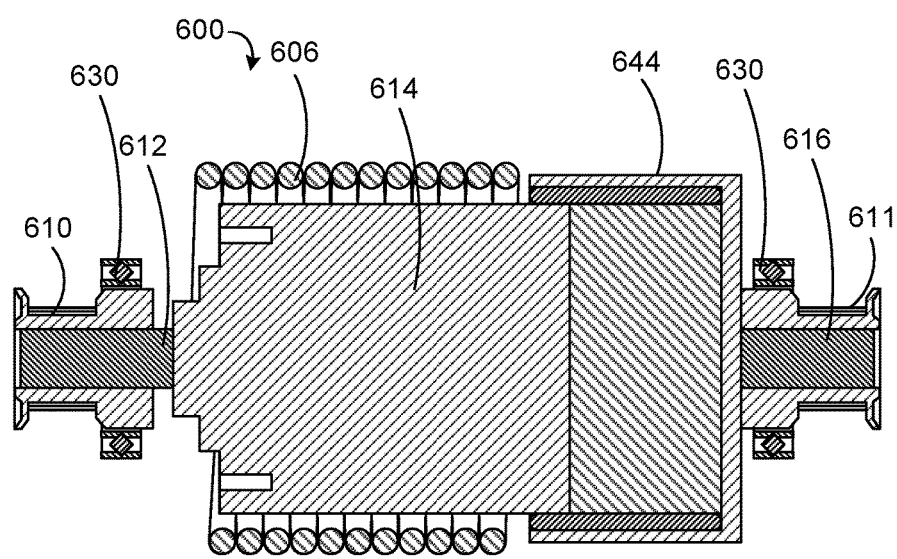
FIG. 6B illustrates a cross sectional view of the assembly of FIG. 6A, according to an example implementation.

FIGS. 6A and 6B illustrate an actuator and spring assembly 600 according to an example embodiment. FIG. 6A illustrates a profile view of the actuator and spring assembly, including shaft 612, motor 614, spring 606, and ball bearings 630. Shaft 612 and motor 614 may be configured such that activation of motor 614 causes shaft 612 to rotate in a clockwise direction, while motor 614 rotates in a counter-clockwise direction. Ball bearings 630 may allow the motor and shaft to rotate in opposite directions.

In some examples, shaft 612 may be coupled to shaft output gear 610. Shaft output gear 610 may be coupled to a first finger, such that rotation of shaft 612 causes shaft output gear 610 to rotate, which in turn causes a first finger of the robotic gripping device to move. Further, rotation of shaft 612 relative to motor 614 may cause motor 614 to rotate in a direction opposite the rotation of shaft 612. Motor 614 may be coupled to a first end of spring 606 at a first connection point 640. The second end of spring 606 may then be coupled to motor output shaft 616 at a second connection point 642, which in turn may be coupled to motor output gear 611. As a particular example, FIG. 6 shows a first connection point 640 that couples the first end of spring 606 to motor 614. Second connection point 642 then couples the second end of spring 606 to motor output shaft 616 through a connecting cap 644.

As a result of the couplings described above, rotation of shaft 612 relative to motor 614 may cause the shaft output gear 610 and motor output gear 611 to rotate, which may cause the robotic fingers to rotate toward or away from each other. The rotation of shaft 612 may be directly passed onto shaft output gear 610, while the rotation of motor 614 may pass through spring 606 to motor output shaft 616, and then to motor output gear 611. In this manner, a single actuator may cause the movement of both fingers of the robotic gripping device.

IV. EXAMPLE OPERATIONS

Figure 7:
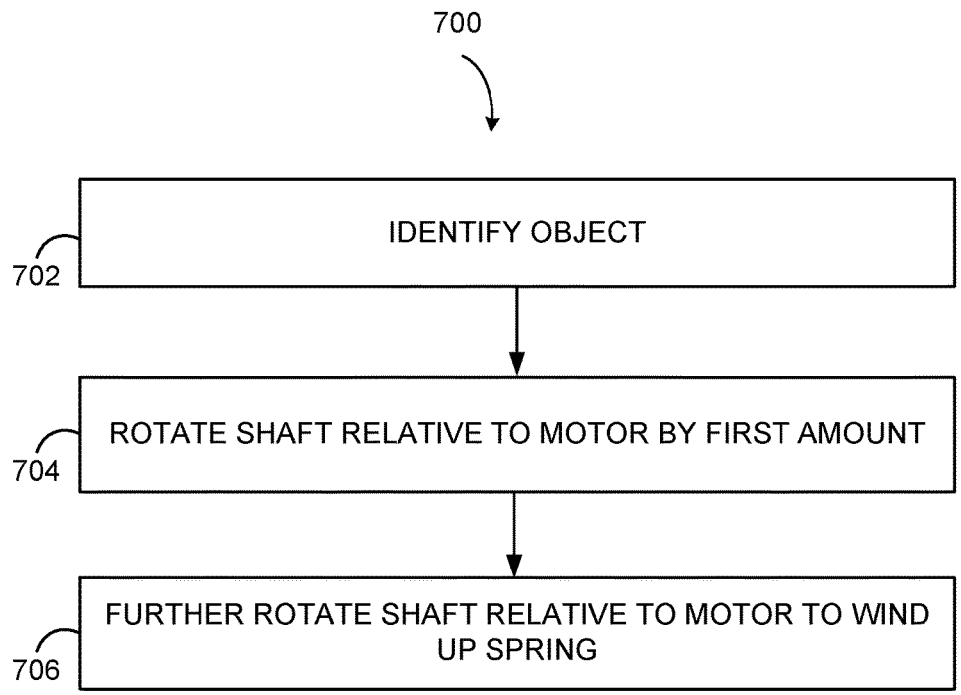
FIG. 7 illustrates an example method of operating a robotic gripping device, according to an example implementation.

FIG. 7 illustrates a flowchart of an example method 700 of operating a robotic gripping device of the present disclosure. This example applies to a robotic gripping device such as robotic gripping device 400, but may be applied to other robotic gripping devices having different arrangements and/or different components than those described herein. Further, method 700 may be carried out by one or more control systems of the robotic system 100 and/or robotic arm 200.

At block 702, method 700 may include identifying an object for a robotic gripping device to grasp, grip, pinch, grab, or hold. In some examples, identifying the object may include determining an object based on its shape, orientation, profile, size, or another characteristic. In other examples, the object may be identified by a remote operator and/or computing system coupled to the robotic gripping device. The determination may be made based on received sensor data from one or more sensors, such as a visual sensor, touch sensor, pressure sensor, or other sensor, for example. Block 702 may also include a robotic device positioning the robotic gripping device such that the object is between the fingers of the robotic gripping device.

In some examples the robotic gripping device may include two opposable fingers that are configured to move toward each other to grasp the object. The robotic gripping device may also include an actuator having a motor and a shaft, wherein the shaft is coupled to a first finger of the two fingers. The robotic gripping device may also include a torsion spring surrounding the actuator, with a first end of the torsion spring coupled to the motor and a second end of the torsion spring coupled to the second finger of the two fingers.

Figure 8A:
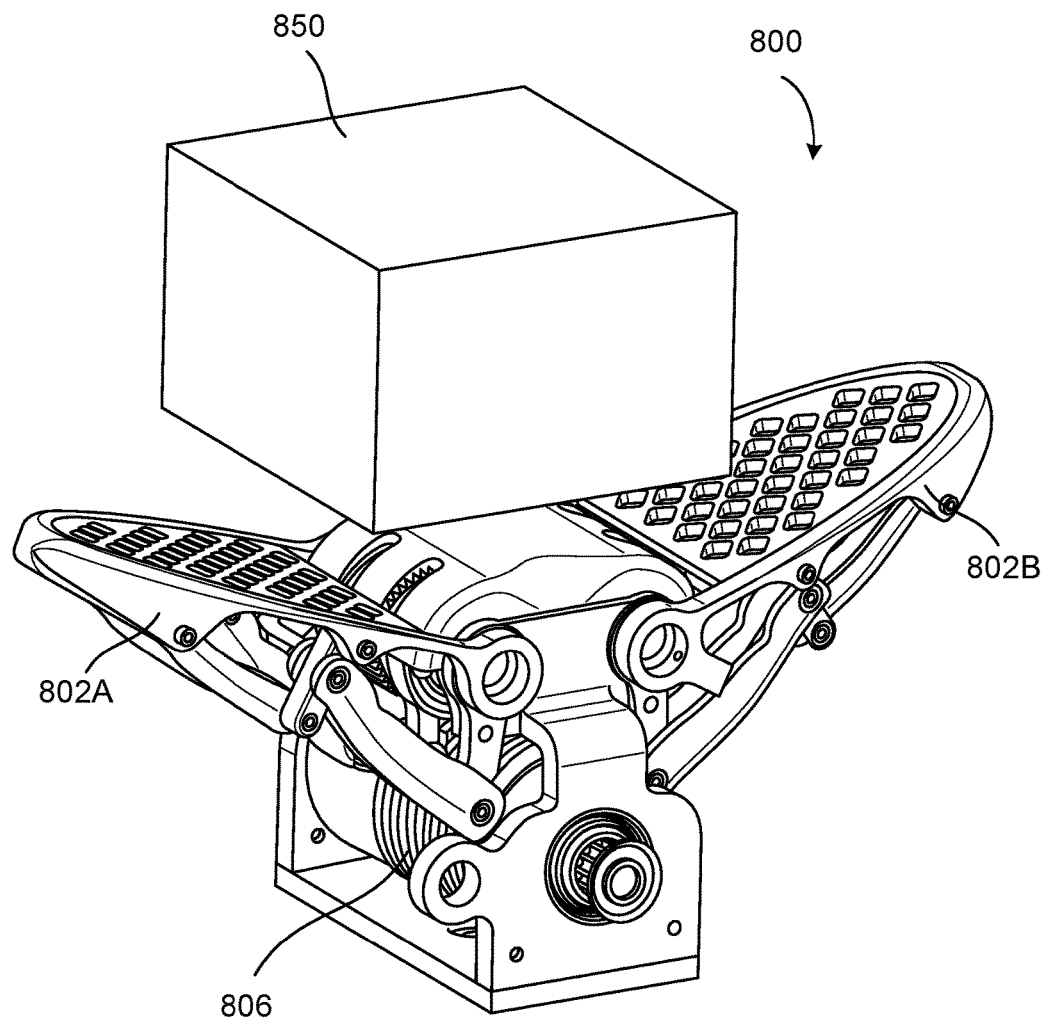
FIGS. 8A, 8B, and 8C illustrate example states of a robotic gripping device, according to an example implementation.
Figure 8B:
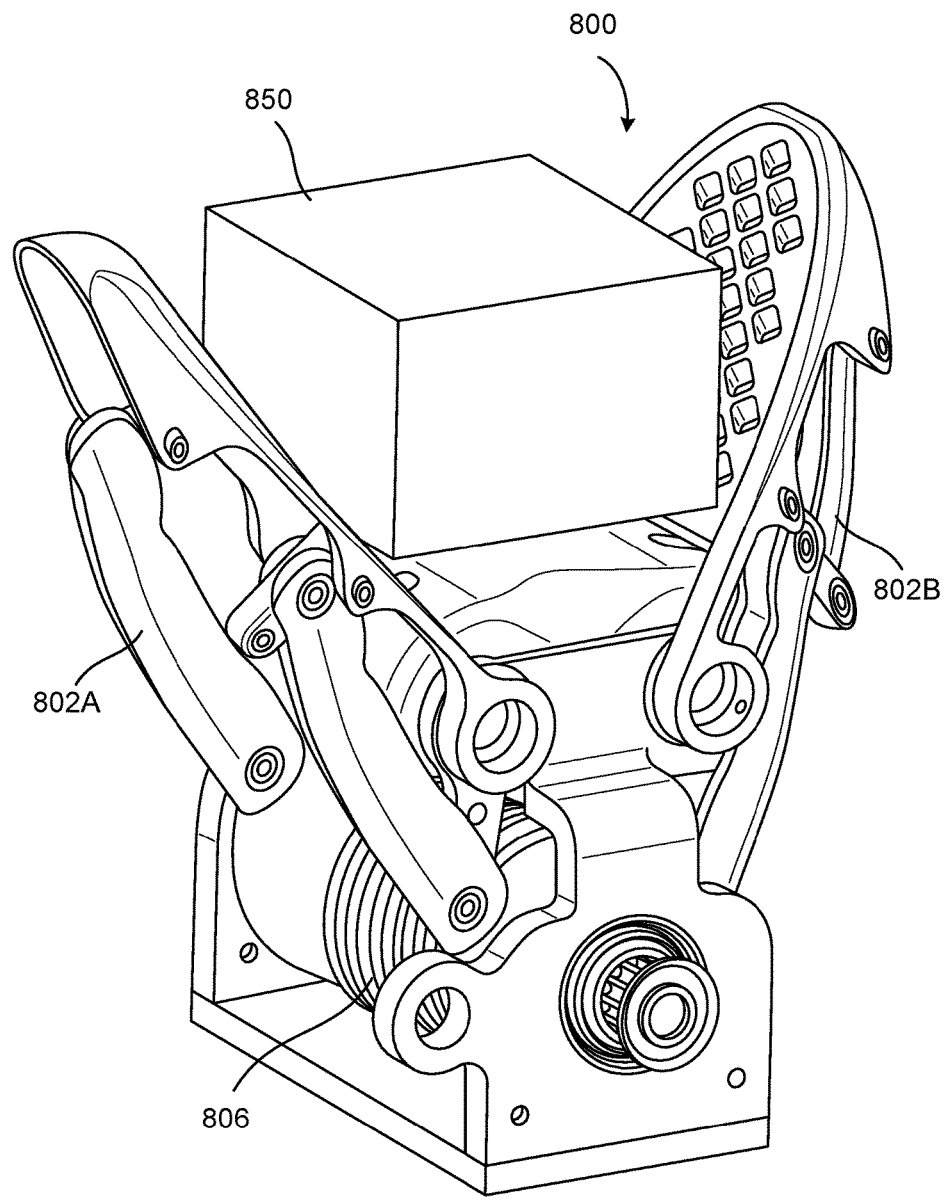

At block 704, method 700 may include rotating the shaft of the actuator relative to the motor by a first amount. Prior to rotation of the shaft relative to the motor, the shaft and motor may be in a first position, in which the fingers of the robotic gripping device are in an open position. This position can be seen in FIG. 8A in which fingers 802A-B of robotic gripping device 800 are in an open position. Also in FIG. 8, object 850 is positioned between fingers 802A-B. At block 704, rotation of the shaft relative to the motor by the first amount may cause the fingers to move closer together, for instance by rotating to close on the identified object in a pinching grasp. This position can be seen in FIG. 8B. It should be noted that spring 806 has not compressed or twisted, but has rotated along with the motor. The first amount of rotation of the shaft relative to the motor may be an amount such that the fingers close and both make contact with the identified object. As described above, rotation of the shaft relative to the motor may include rotation of both the shaft and motor in opposite directions from each other. Further, the shaft and motor may be coupled to the fingers of the robotic gripping device, such that rotation of the shaft causes the first finger to move, while rotation of the motor causes the spring to rotate, which in turn causes the second finger to move. Thus, the fingers may close on the identified object.

In some examples, the first amount of rotation of the shaft relative to the motor may be such that the fingers continue to rotate until they are prevented from further rotation by the identified object. The fingers may continue to close on the object, and may compress the object if it is compressible such as a sponge, for example. Alternatively, the fingers may be prevented from further rotation by contact with each other.

Figure 8C:
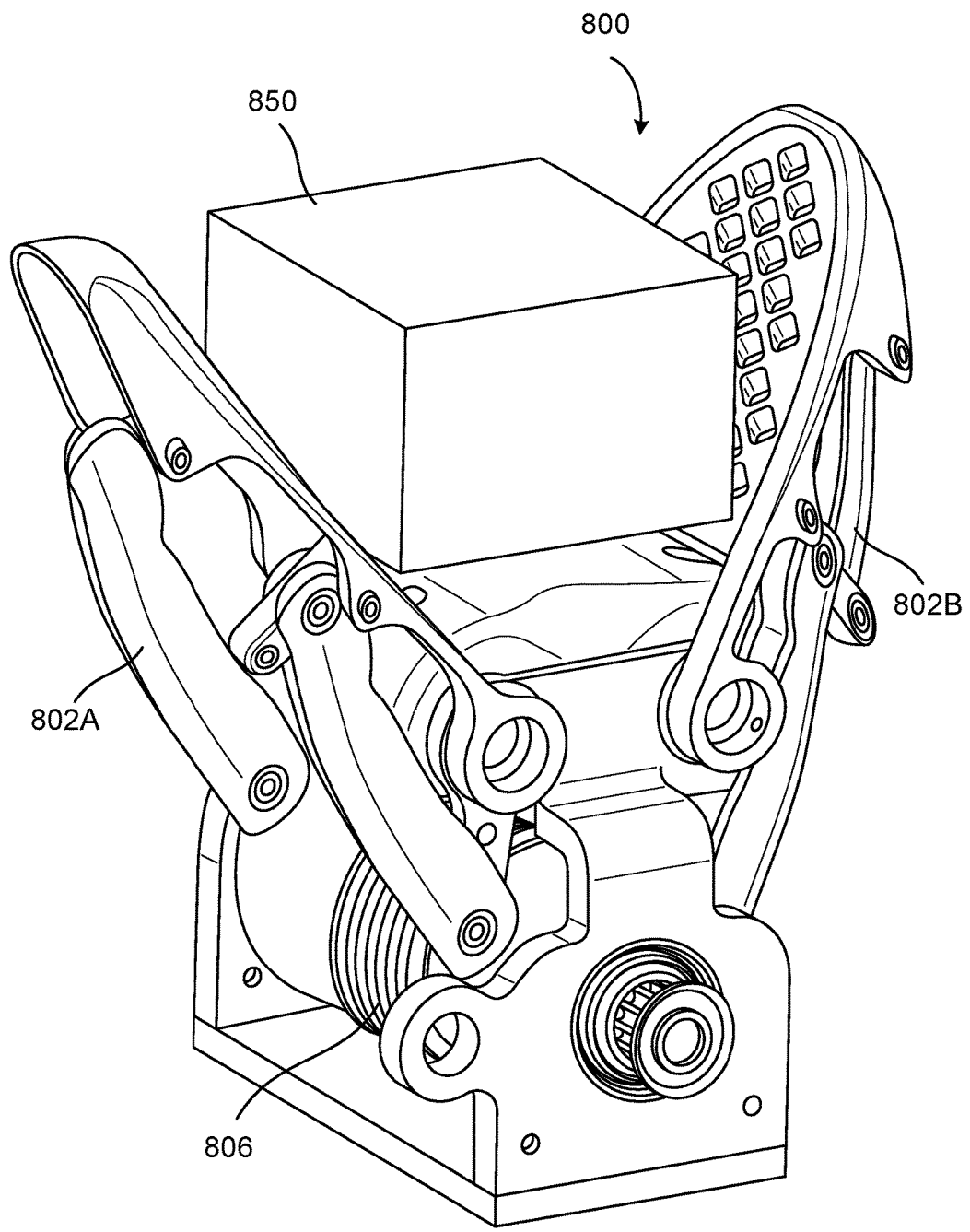

Once the fingers are prevented from further movement, block 706 of method 700 may include further rotating the shaft relative to the motor (i.e., attempting to close the fingers further). But instead of this further rotation of the shaft relative to the motor causing the fingers to further close on the identified object (or further close on each other), the additional rotation may cause the spring to wind up. FIG. 8C illustrates this position of the robotic gripping device.

As shown in FIG. 8C, when the fingers are prevented from further movement, the shaft is prevented from rotating further, because the first finger cannot move. And the second end of the spring is prevented from rotating further, because the second finger cannot move and is coupled to the second end of the spring. As a result, when the shaft further rotates relative to the motor, it is actually the motor that rotates relative to the shaft. This rotation of the motor causes the first end of the spring coupled to the motor to rotate as well, while the first end of the spring remains fixed. And in this manner, the motor twists the spring and the spring is wound up. As shown in FIG. 8C, the additional rotation has caused spring 806 to wind up as compared to FIG. 8B, in which no additional rotation of the shaft relative to the motor has occurred.

In some examples, the robotic gripping device carrying out method 700 may include one or more encoders, such as the actuator encoder and finger encoder described above with respect to FIG. 4. In those examples, method 700 may further include determining a torque applied to the fingers of the gripping device. The torque may be determined in the gripping direction, and may be the torque applied to the fingers by the actuator when the fingers are prevented from further movement, as described above.

In order to determine the torque applied to the fingers, the control system may receive information from the one or more encoders indicating the rotation of the shaft relative to the motor and the position and/or rotation of the fingers. These values, in combination with the characteristics of the spring (e.g., size, firmness, spring constant, material) can be used to determine the torques and forces acting on the fingers and other components of the robotic gripping device.

In a particular example, where there is a one-to-one correspondence between the actuator encoder and finger encoder, the control system may determine the torque acting on the fingers based on the difference between the information received from the encoders. For instance, where the actuator encoder indicates a three quarters turn and the finger encoder indicates a quarter turn each, the amount of torque acting on the fingers is approximately equal to the amount of force required to rotate the spring by one quarter turn (i.e., the subtraction of one encoder value from the other, multiplied by a spring value). In this manner, where the characteristics of the spring are known, the present disclosure provides a simple method of determining the torque acting on fingers of a robotic gripping device.

VI. EXAMPLE VARIATIONS

The examples above have been described with respect to a particular arrangement of components in which the shaft couples to the first finger (without a spring), and the motor couples through the spring to the second finger. One particular variation may include a robotic gripping device similar to those described above, but with the shaft coupled through the spring to the first finger, while the motor is coupled (without a spring) to the second finger.

In particular, this example robotic gripping device may include two opposable fingers configured to move toward each other to grasp an object. The robotic gripping device may also include an actuator having a motor and a shaft, in which the motor is coupled to a first finger. The robotic gripping device may also include a spring, where the first end of the spring is coupled to the shaft of the actuator and the second end of the spring is coupled to the second of the two fingers. Rotation of the shaft may cause the coupled spring to rotate, which in turn may cause the first finger to move. In addition, rotation of the motor may cause the second finger to move. The functionality of this example robotic gripping device may otherwise be similar or identical to the descriptions above.

VII. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A robotic gripping device comprising:
   two opposable fingers configured to move toward each other to grasp an object;
   an actuator having a motor and a shaft, wherein the shaft is coupled to a first finger of the opposable fingers; and
   a torsion spring surrounding the actuator, the torsion spring having a first end and a second end, wherein the first end is coupled to the motor of the actuator and the second end is coupled to a second finger of the two opposable fingers;
   wherein the actuator is configured to:
      rotate the shaft relative to the motor by a first amount to move the two opposable fingers toward each other to contact the object; and
      when the two opposable fingers are both in contact with the object and the object prevents the fingers from further movement toward each other, further rotate the shaft relative to the motor to wind up the torsion spring.

2. The robotic gripping device of claim 1, wherein the two opposable fingers are hyper-underactuated, such that the actuator is configured to move the first finger of the two fingers when the second finger of the two fingers is prevented from movement.

3. The robotic gripping device of claim 1, wherein the two opposable fingers are configured to rotate about two respective axes to grasp the object in a pinching grasp.

4. The robotic gripping device of claim 1, wherein the two opposable fingers are configured to move translationally to grasp the object.

5. The robotic gripping device of claim 1, further comprising a base section, wherein the actuator is rotatably coupled to the base section via two rotary bearings.

6. The robotic gripping device of claim 1, further comprising:
   an actuator encoder configured to detect a rotation amount of the shaft relative to the motor;
   a finger encoder configured to detect a movement amount of the opposable fingers; and
   a control system, wherein the control system is configured to determine an amount of torque applied to the two opposing fingers in a gripping direction based on the actuator encoder, the finger encoder, and a characteristic of the torsion spring.

7. The robotic gripping device of claim 6, wherein the control system is further configured to determine the amount of torque applied to the two opposing fingers in the gripping direction based on a difference between the rotation amount detected by the actuator encoder and the movement amount detected by the finger encoder.

8. The robotic gripping device of claim 6, wherein the torsion spring has a spring constant, and wherein the control system is further configured to determine the amount of torque applied to the two opposing fingers in the gripping direction based on the spring constant.

9. A robotic gripping device comprising:
   two opposable fingers configured to move toward each other to grasp an object;
   an actuator having a motor and a shaft, wherein the motor is coupled to a first finger of the opposable fingers; and
   a torsion spring surrounding the actuator, the torsion spring having a first end and a second end, wherein the first end is coupled to the shaft of the actuator and the second end is coupled to a second finger of the two opposable fingers;
   wherein the actuator is configured to:
      rotate the shaft relative to the motor by a first amount to move the two opposable fingers toward each other to contact the object; and
      when the two opposable fingers are both in contact with the object and the object prevents the fingers from further movement toward each other, further rotate the shaft relative to the motor to wind up the torsion spring.

10. The robotic gripping device of claim 9, wherein the two opposable fingers are hyper-underactuated, such that the actuator is configured to move the first finger of the two fingers when the second finger of the two fingers is prevented from movement.

11. The robotic gripping device of claim 9, wherein the two opposable fingers are configured to rotate about two respective axes to grasp the object in a pinching grasp.

12. The robotic gripping device of claim 9, wherein the two opposable fingers are configured to move translationally to grasp the object.

13. The robotic gripping device of claim 9, further comprising a base section, wherein the actuator is rotatably coupled to the base section via two rotary bearings.

14. The robotic gripping device of claim 9, further comprising:

an actuator encoder configured to detect a rotation amount of the shaft relative to the motor;

a finger encoder configured to detect a movement amount of the opposable fingers; and a control system, wherein the control system is configured to determine an amount of torque applied to the two opposing fingers in a gripping direction based on the actuator encoder, the finger encoder, and a characteristic of the torsion spring.

15. The robotic gripping device of claim 14, wherein the control system is further configured to determine the amount of torque applied to the two opposing fingers in the gripping direction based on a difference between the rotation amount detected by the actuator encoder and the movement amount detected by the finger encoder.

16. The robotic gripping device of claim 14, wherein the torsion spring has a spring constant, and wherein the control system is further configured to determine the amount of torque applied to the two opposing fingers in the gripping direction based on the spring constant.

17. A method comprising:

identifying an object for a robotic gripping device to grasp, wherein the robotic gripping device comprises two opposable fingers, an actuator, and a torsion spring, wherein:

(i) the two opposable fingers are configured to move toward each other to grasp the object;

(ii) the actuator has a motor and a shaft, wherein the shaft is coupled to a first finger of the two opposable fingers; and (iii) the torsion spring surrounds the actuator and has first and second ends, wherein the first end of the torsion spring is coupled to the motor of the actuator and the second end of the torsion spring is coupled to a second finger of the two opposable fingers;

rotating the shaft of the actuator relative to the motor by a first amount to move the two opposable fingers toward each other to contact the object; and when the two opposable fingers are both in contact with the object and the object prevents the fingers from further movement toward each other, further rotating the shaft of the actuator relative to the motor to wind up the torsion spring.

18. The method of claim 17, wherein the two opposable fingers are hyper-underactuated, such that the actuator is configured to move the first finger of the two fingers when the second finger of the two fingers is prevented from movement.

19. The method of claim 17, wherein the robotic gripping device further comprises:

an actuator encoder configured to detect a rotation amount of the shaft relative to the motor;

a finger encoder configured to detect a movement amount of the opposable fingers; and a control system, wherein the method further comprises:

determining, by the control system, an amount of torque applied to the two opposing fingers in a gripping direction based on the actuator encoder, the finger encoder, and a characteristic of the torsion spring.

20. The method of claim 19, wherein determining, by the control system, the amount of torque applied to the fingers comprises:

determining a difference between the rotation amount detected by the actuator encoder and the movement amount detected by the finger encoder; and determining the amount of torque based on the difference.

* * * * *